(12) United States Patent
Monereau

(10) Patent No.: US 6,911,066 B2
(45) Date of Patent: Jun. 28, 2005

(54) METHOD FOR TREATING A GAS MIXTURE BY ADSORPTION

(75) Inventor: Christian Monereau, Paris (FR)

(73) Assignee: L'Air Liquide, Société Anonyme á Directoire et Conseil de Surveillance pour l'Etude et l'Exploitation des Procédés Georges Claude, Paris (FR)

(*) Notice: Subject to any disclaimer, the term of this patent is extended or adjusted under 35 U.S.C. 154(b) by 0 days.

(21) Appl. No.: 10/487,177

(22) PCT Filed: Nov. 20, 2002

(86) PCT No.: PCT/FR02/03973
§ 371 (c)(1),
(2), (4) Date: Feb. 17, 2004

(87) PCT Pub. No.: WO03/049839
PCT Pub. Date: Jun. 19, 2003

(65) Prior Publication Data
US 2005/0000354 A1 Jan. 6, 2005

(51) Int. Cl.⁷ .................. B01D 53/047; B01D 53/22
(52) U.S. Cl. ............ 95/96; 95/51; 95/55; 95/99; 95/120; 95/123; 95/139
(58) Field of Search ............... 95/45, 51, 55, 95/96–106, 139, 140

(56) References Cited

U.S. PATENT DOCUMENTS

| | | | | |
|---|---|---|---|---|
| 4,077,779 A | * | 3/1978 | Sircar et al. ............. | 95/26 |
| 4,229,188 A | * | 10/1980 | Intille ..................... | 95/55 |
| 4,238,204 A | * | 12/1980 | Perry ...................... | 95/55 |
| 4,783,203 A | * | 11/1988 | Doshi ..................... | 95/50 |
| 4,981,499 A | * | 1/1991 | Hay et al. ................ | 95/100 |
| 5,026,406 A | * | 6/1991 | Kumar ..................... | 95/101 |
| 5,232,473 A | * | 8/1993 | Kapoor et al. ........... | 95/101 |
| 5,330,561 A | * | 7/1994 | Kumar et al. ............ | 95/101 |
| 5,435,836 A | * | 7/1995 | Anand et al. ............. | 95/45 |
| 5,505,764 A | * | 4/1996 | Fuentes ................... | 95/96 |
| 5,980,857 A | * | 11/1999 | Kapoor et al. ........... | 423/648.1 |
| 5,989,313 A | * | 11/1999 | Mize ....................... | 95/10 |
| 5,993,517 A | * | 11/1999 | Chen et al. .............. | 95/98 |
| 6,315,818 B1 | * | 11/2001 | Monereau ................ | 95/98 |
| 6,322,611 B1 | * | 11/2001 | Engler .................... | 95/55 |
| 6,402,814 B1 | * | 6/2002 | Kraus et al. ............. | 95/106 |

FOREIGN PATENT DOCUMENTS

| EP | 0359628 A1 | * | 3/1990 |
|---|---|---|---|
| EP | 0411506 A2 | * | 2/1991 |
| EP | 0537614 A1 | * | 4/1993 |
| EP | 0748765 A1 | * | 12/1996 |
| EP | 1004343 A1 | * | 5/2000 |

* cited by examiner

Primary Examiner—Robert H. Spitzer
(74) Attorney, Agent, or Firm—Linda K. Russell

(57) ABSTRACT

A method for operating a typical cyclic adsorption unit that is easily implemented in both new and existing treatment plants, wherein fluctuations in the stream compositions due to the adsorption and regeneration phase transitions of the cycles are minimized.

29 Claims, 3 Drawing Sheets

METHOD FOR TREATING A GAS MIXTURE BY ADSORPTION

BACKGROUND OF THE INVENTION

1. Field of the Invention

The present invention relates to an adsorption process for treatment of a gas mixture comprising at least one main constituent to be produced and impurities to be separated from said mixture, especially for the production of carbon monoxide with streams having predetermined hydrogen/carbon monoxide ratios.

2. Related Art

Throughout the text, the gas pressures indicated are in bar absolute.

Such a treatment process is widely used to separate "noble" constituents to be produced, that are contained in the gas mixture, from undesirable constituents, generally denoted by the term "impurities".

The typical process is cyclic and involves at least two adsorbers, of at least two adsorption units having respectively several adsorbers operating in common, which follow in an offset manner the same operating cycle. This cycle conventionally comprises an adsorption phase, during which the corresponding adsorber is subjected to the gas mixture and adsorbs the impurities thereof, and a regeneration phase, during which the adsorber is subjected to a regeneration gas and is desorbed of the impurities that it had previously adsorbed.

Depending on whether or not the regeneration phase is accompanied by heating of the regeneration gas, it is common practice to distinguish cycles called TSA (Temperature Swing Adsorption) cycles from cycles called PSA (Pressure Swing Adsorption) cycles.

It is also known that the adsorbers may be subjected to depressurization and repressurization steps and to a step of paralleling the adsorbers, during which the total stream of treated gas is obtained both by the treatment of a first flow of gas by at least one adsorber terminating its adsorption phase and by the treatment of a second flow of gas to be treated by at least one other adsorber starting its adsorption phase. This paralleling is conventionally intended to prevent pressure surges in the stream of treated gas during passage in production from one adsorber to another, especially in order to take into account the operating time of the valves that implement the paralleling operation.

However, adsorption treatment cycles have drawbacks during transient periods at the start of the adsorption and regeneration phases, as partly explained in document EP-A-00 748 765.

That document describes a carbon monoxide production plant comprising a cryogenic production unit and, upstream of the latter, a treatment unit that employs a process of the type defined above. This plant is intended to retain the water and carbon dioxide of a gas mixture rich in carbon monoxide and in hydrogen coming from a hydrocarbon steam reforming unit. Fixing the carbon monoxide by the adsorbent of the adsorber that is starting its adsorption phase causes an appreciable reduction in the carbon monoxide content of the stream output by this adsorber, together with fluctuations in the flow rate of this stream. The solution proposed in EP-A-0 748 765 consists in interposing, between the adsorption treatment unit and the cryogenic carbon monoxide production unit, a tank filled with an adsorbent having an affinity for carbon monoxide.

This solution proves to be particularly expensive in terms of investment, is not very modular and attains only to the transient period when each adsorber returns to production, whereas similar transient phenomena occur at the start of the regeneration phase of each adsorber, the stream leaving the adsorbers exhibiting large fluctuations in content and in flow rate.

SUMMARY OF THE INVENTION

The object of the invention is to propose a process of the type defined above, that is easily implemented in the treatment plants of the prior art and that makes it possible to obviate stream perturbations due to the absorption and regeneration phase transitions of the cycles of known processes.

For this purpose, the subject of the invention is a process of the aforementioned type, in which N adsorbers are used, where N is greater than or equal to 2, each following in an offset manner the same cycle of period T, during which there are in succession an adsorption phase and a regeneration phase using a regeneration gas, and in that each adsorber at the start of the phase and/or at the start of the use of the regeneration gas is subjected to only a portion of the nominal flow of the gas mixture to be treated, or alternatively of the nominal flow of the regeneration gas, until said adsorber is substantially saturated with, or alternatively substantially discharged of, at least one of the main constituents to be produced, while maintaining at least one other adsorber in adsorption phase.

BRIEF DESCRIPTION OF THE DRAWINGS

The invention will be more clearly understood on reading the description that follows, given solely by way of example and with reference to the appended drawings, in which.

DESCRIPTION OF THE PREFERRED EMBODIMENTS

Figure 1:
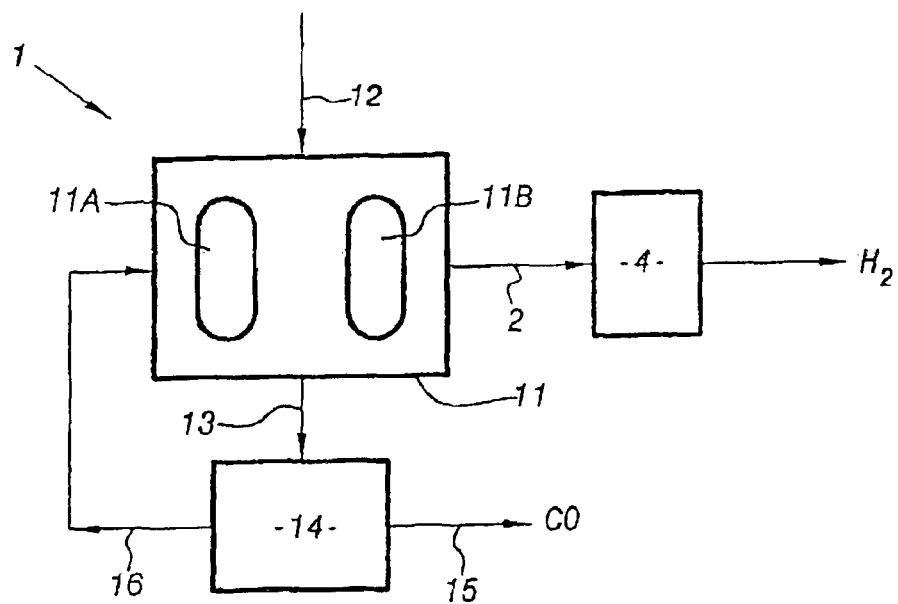
FIG. 1 is a schematic view of a carbon monoxide production plant according to the invention combined with a pure hydrogen production unit.

Thus, one subject of the invention is a first adsorption process for the treatment of a gas mixture comprising at least one main constituent to be produced and impurities to be separated from said mixture, in which N adsorbers are used, where N is greater than or equal to 2, each following in an offset manner the same cycle of period T, during which there are in succession an adsorption phase and a regeneration phase, and each adsorber (11A) at the start of the adsorption phase (step I or step IV) is subjected to only a portion of the nominal flow of the gas mixture to be treated, until said adsorber is substantially saturated with at least one of the main constituents to be produced, while maintaining at least one other adsorber (11B) in adsorption phase.

According to other features of this process:

in order to form the treated gas mixture, the stream coming from the adsorber subjected to said portion is mixed with the stream coming from said at least one other adsorber in adsorption phase;

the duration of the adsorption phase of each adsorber is between T/N inclusive and 2T/N noninclusive;

the adsorption treatment of the gas mixture is carried out—for most of the time—by a single adsorber in adsorption phase; and after said adsorber has been subjected at the start of the adsorption phase to said portion of the nominal flow of the gas mixture to be treated, said adsorber is subjected to a paralleling step, during which the flow of treated gas is obtained half by said adsorber and half by said at least one other adsorber in adsorption phase.

Another subject of the invention is a second adsorption process for the treatment of a gas mixture comprising at least one main constituent to be produced and impurities to be separated from said mixture, characterized in that N adsorbers are used, where N is greater than or equal to two, each following in an offset manner the same cycle of period T, during which there are in succession an adsorption phase and a regeneration phase using a regeneration gas, and in that each adsorber is subjected at the start of use of the regeneration gas to only a portion of said nominal flow of the regeneration gas, until said absorber is substantially discharged of at least one of the main constituents to be produced.

According to other features of this second process:

in order to form a discharged gas stream, the stream coming from the adsorber subjected to said portion is mixed with the rest of the nominal flow of the regeneration gas;

the stream coming from the adsorber subjected to said portion and the rest of the nominal flow of the regeneration gas are mixed together directly;

the stream coming from the adsorber subjected to said portion is mixed with the stream coming from another adsorber that terminates its regeneration phase and that is subjected to at least a portion of the rest of the nominal flow of regeneration gas;

the regeneration phase of each adsorber comprises a step of depressurizing and a step of repressurizing said adsorber; and the phase of regenerating each adsorber comprises a step of heating the regeneration gas.

Shown in FIG. 1 is a carbon monoxide production plant 1 connected upstream, via a line 2, to a hydrogen production unit 4.

The plant 1 comprises, upstream, an adsorption treatment unit 11 suitable for removing most of the impurities, especially water and carbon dioxide, that are contained in a gas mixture fed by a feed line 12 and compressed to a pressure of between 15 and 45 bar. This gas mixture is compressed, for example, to below 15.5 bar and has a nominal flow rate, namely the total flow rate in the line 12, of between a few hundred and several tens of thousands of $Sm^3/h$. This gas mixture includes, as main constituents, hydrogen and carbon monoxide, at 73.5 and 21.6 mol % respectively, and possibly secondary constituents, such as nitrogen and methane, for example with respective contents of 1.1 and 3.8 mol %, and it also contains, as impurities, between 10 and 200 molar ppm (parts per million) of carbon dioxide, and also water, generally to saturation.

The unit 11 comprises two adsorbers 11A, 11B placed alternately in line in order to purify the gas mixture by adsorption. Each adsorber contains an adsorbent placed either in the form of a single bed, formed from a zeolite or from activated alumina optionally doped in order to increase its carbon dioxide stopping capacity, or in the form of a plurality of beds formed respectively from activated alumina or from silica gel in order essentially to stop water, and of a zeolite (for example of the A, X or LSX type) in order essentially to stop carbon dioxide. The adsorbent may also consist of mixtures of adsorbents or of composite adsorbents.

The treatment unit 11 also includes valves and connecting pipes which are not shown in FIG. 1, but the arrangement of which will become more clearly apparent during the description of the operation of this unit.

The plant 1 comprises, connected via a line 13 downstream of the treatment unit 11, a cryogenic separation unit 14 that includes a substantially pure carbon monoxide production line 15 and a line 16 outputting a stream with a high hydrogen content. For the composition of the gas mixture indicated above, the stream in the line 16 may contain 97.4 mol % hydrogen, 0.3 mol % nitrogen, 0.3 mol % carbon monoxide and 2 mol % methane, at about 14.5 bar. Since this separation unit 14 is known per se, it will not be explained in detail further.

The line 16 is connected to the treatment unit 11 in order to allow regeneration of the adsorber 11A, 11B that is not in the production line, the stream having a high hydrogen content in line 16 being used, at least partly, as gas for regenerating the adsorbent of this adsorber. The total flow rate of the line 16 forms, for the example shown, the nominal flow rate of the regeneration gas.

The regeneration gas output by the adsorption treatment unit is conveyed by the line 2 to the hydrogen production unit 4, known per se. This unit 4 may, for example, comprise six adsorbers operating cyclically and suitable for producing a substantially pure hydrogen stream.

Figure 2:
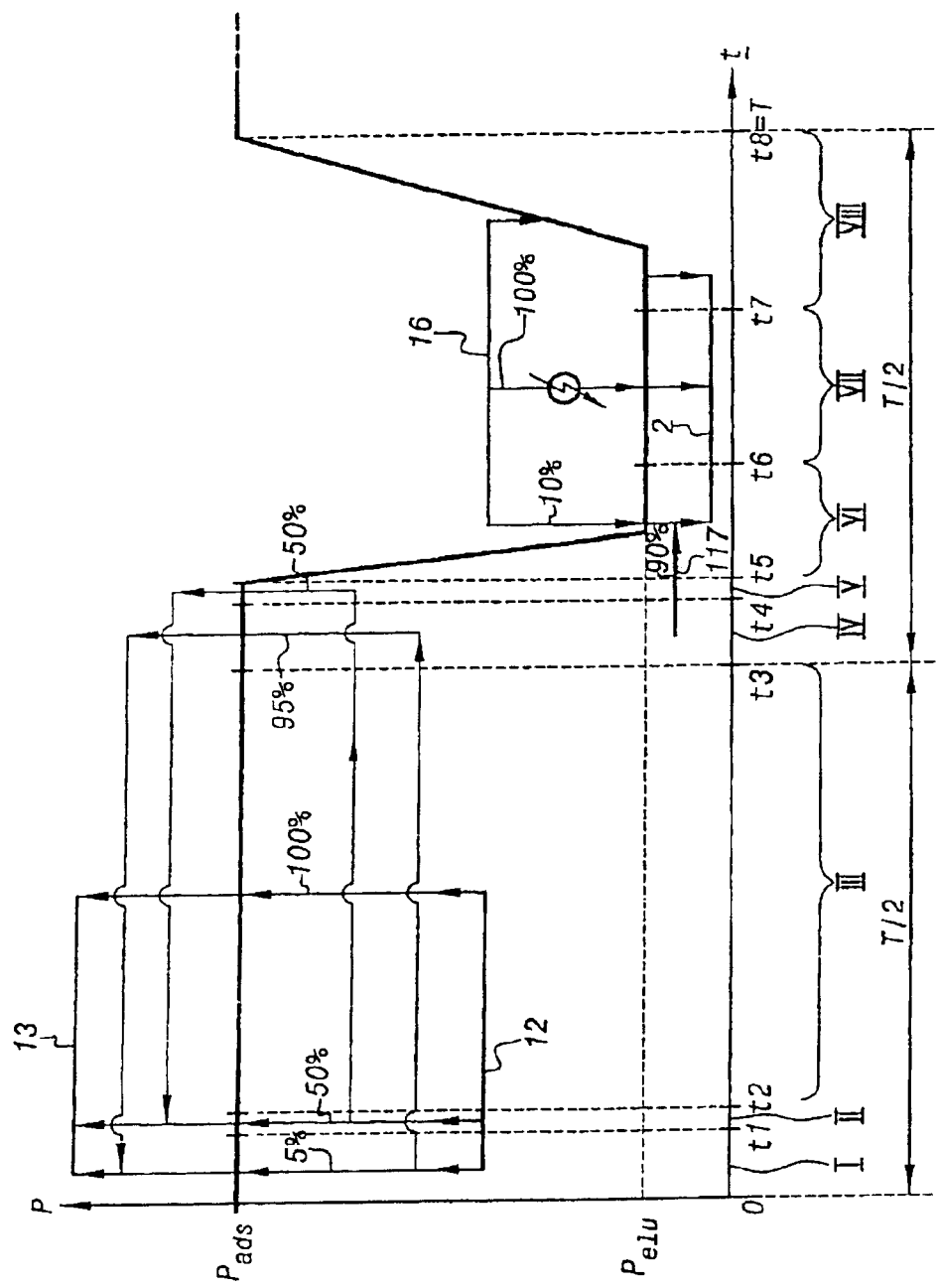
FIG. 2 is a diagram illustrating the operating cycle of the adsorbers of the plant shown in FIG. 1.

The process employed by the adsorption treatment unit 11 is obtained by repeating the cycle illustrated in FIG. 2. Each of the two adsorbers 11A, 11B follows the cycle shown in FIG. 2, with a time shift relative to the other adsorber corresponding to a time interval equal to substantially one half of the period T of the cycle.

In FIG. 2, in which the times t are plotted on the x-axis and the absolute pressures P are plotted on the y-axis, the lines headed by arrows indicate the movements and destinations of the gas currents, and also the direction of circulation in the adsorbers 11A and 11B, respectively. When an arrow parallel to the y-axis points upwards (toward the top of the diagram), the current is said to be co-current in the adsorber, if the arrow pointing upward lies below the line indicating the pressure in the adsorber, the current enters the adsorber at the inlet end of the adsorber, if the arrow pointing upward lies above the line indicating the pressure, the current leaves the adsorber via the outlet end of the adsorber, the inlet and outlet ends being those for the gas to be treated and for the gas withdrawn in the production phase, respectively. When an arrow parallel to the y-axis points downward (toward the bottom of the diagram), the current is said to be countercurrent in the adsorber; if the arrow pointing downward lies below the line indicating the pressure of the adsorber, the current leaves the adsorber via the inlet end of the adsorber if the arrow pointing downward lies above the line indicating the pressure, the current enters the adsorber via the outlet end of the adsorber, the inlet and outlet ends again being those for the gas to be treated and for the gas withdrawn in the production phase.

The cycle shown in FIG. 2 comprises eight successive steps, denoted by I to VIII, which will be described in succession by considering, for example, that the absorber 11A starts its adsorption phase at time t0=0. The period T of the cycle is, for example, equal to 960 minutes for an adsorption pressure $P_{ads}$ of about 15.5 bar.

Figure 3:
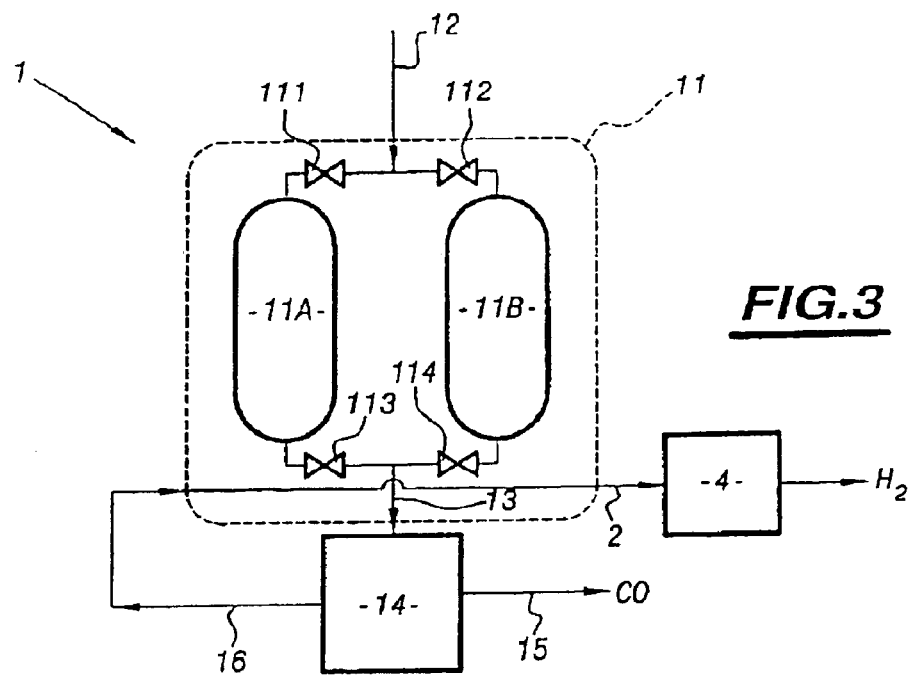
FIGS. 3 and 4 are schematic views of the plant shown in FIG. 1 for time intervals indicated by the numerals I and VI on the cycle shown in FIG. 2.

During step I, from t0 to t1=35 minutes, the adsorbers 11A and 11B are in adsorption phase as shown in FIG. 3, the adsorber 11A receiving only 5% of the flow of the gas mixture in the line 12, via a valve 111 for regulating the flow that passes through it, and the adsorber 11B receiving the remaining 95% of the nominal flow, via a regulating valve 112.

During this step, the freshly regenerated adsorber 11A stops, in addition to the impurities (water and carbon dioxide), the carbon monoxide contained in the gas mixture owing to the chemical affinity of its adsorbent with carbon monoxide. Thus, the purified stream coming from the adsorber 11A, that passes through an open valve 113, is virtually free of carbon monoxide. For the composition of the gas mixture indicated above, the hydrogen content of this stream leaving the adsorber 11A may reach more than 90 mol %. Concomitantly, the adsorbent of the adsorber 11B, which was saturated with carbon monoxide prior to step I, adsorbs only the impurities from the 95% of the gas mixture that are sent to it and produces a purified stream via an open valve 114. The streams from the valves 113 and 114 mix in the connection line 13 so that the carbon monoxide and hydrogen contents of this mixture are very similar to their nominal values, that is to say close, for example, to the content of the stream in this line 13 during the step that precedes step I, the stream coming from the adsorber 11A, with a low flow rate and depleted in carbon monoxide, being diluted in the stream coming from the adsorber 11B.

This step I is complete when most, if not all, of the adsorbent of the adsorber 11A is saturated with carbon monoxide.

During step II, from t1 to t2=10 minutes, wherein the total elapsed time from t0 to t2=45 minutes, the adsorbers 11A and 11B remain in adsorption phase, but are subjected to about 50% of the nominal flow of the gas mixture to be purified, respectively, the valves 111 and 112 being operated accordingly. This step II is akin to a paralleling operation with a symmetrical distribution of the feed gas mixture, as mentioned in the preamble of the application. This paralleling advantageously allows thermal adjustment of the purified stream in the line 13, the stream leaving the freshly regenerated adsorber 11A having a tendency to be hotter than that of the adsorber 11B at the end of the adsorption phase.

During step III, from t2 to t3=T/2=435 minutes, wherein the total elapsed time from t0 to t3=480 minutes, only the adsorber 11A is in adsorption phase, the valve 111 being completely open, and the adsorber 11B switches to the regeneration phase, the valves 112 and 114 being completely closed. Thus, during most of the operating time of the treatment unit 11 (in this case, for more than 90% of this operating time), the gas mixture is treated by a single adsorber 11A.

During step IV, from t3 to t4=35 minutes, wherein the total elapsed time from t0 to t4=515 minutes, the adsorber 11A is at the end of the adsorption phase and the adsorber 11B switches to the adsorption phase, the adsorbers 11A and 11B being subjected to 95% and to 5% of the nominal flow of the gas mixture, respectively, by means of the corresponding adjustment of the valves 111 and 112, and by opening the valve 114. Step IV is therefore similar to step I, the function of the adsorbers 11A and 11B being reversed.

In the same way, step V, the interval between t4 and t5=10 minutes, wherein the total elapsed time from t0 to t5=525 minutes, is similar to step II, the function of the adsorbers 11A and 11B being reversed.

Figure 4:
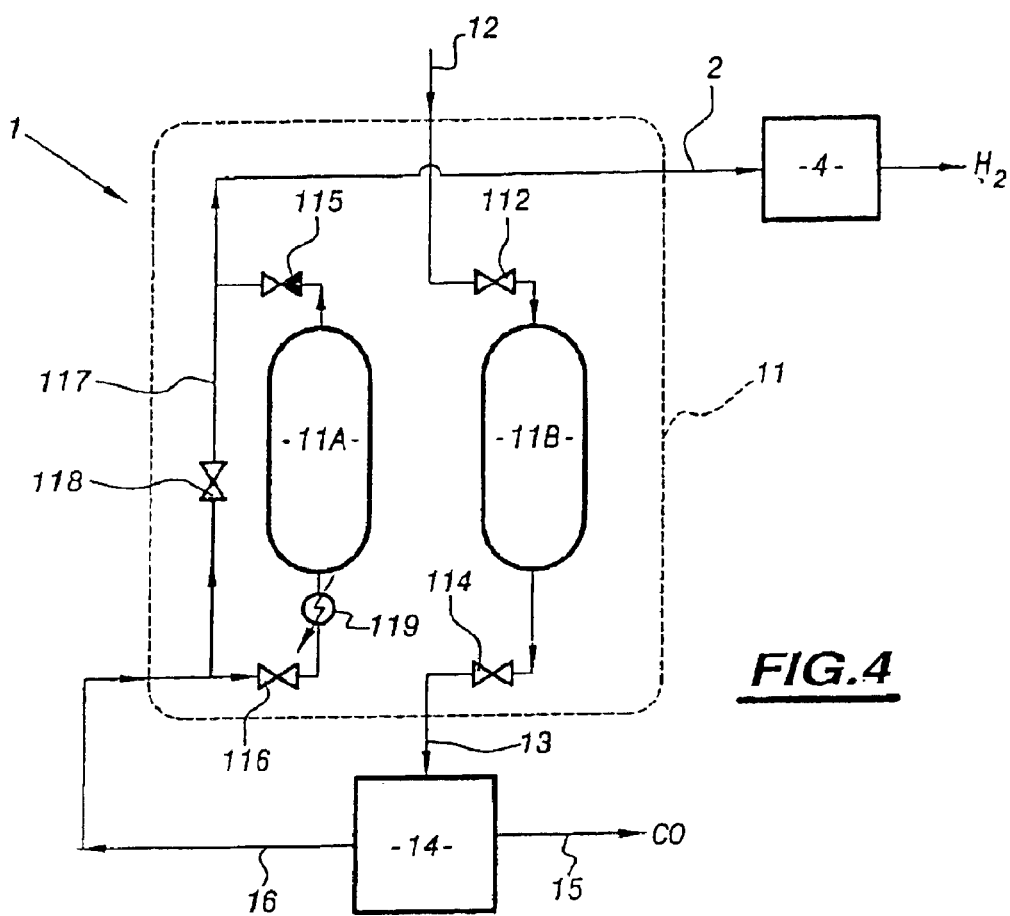

During step VI, from t5 to t6=105 minutes, wherein the total elapsed time from t0 to t6=630 minutes, the adsorber 11A switches to the regeneration phase, the gas mixture being purified completely by the adsorber 11B, as shown in FIG. 4. The adsorber 11A is connected upstream to the line 2 for connection to the hydrogen production unit 4, via an expansion valve 115. The pressure in the adsorber 11A then swings from the pressure $P_{ads}$ to a lower, elution pressure, denoted $P_{elu}$, the value of which depends on the type of process employed in the cryogenic separation unit 14. This elution pressure will, for example, be 1 to 2 bar below the adsorption pressure $P_{ads}$. It may also be of substantially lower value, for example around 3 bar absolute.

Concomitantly with this depressurization, or once the latter has been completed, the adsorber 11A is subjected to the hydrogen-rich stream (regeneration gas) in the line 16, via a valve 116 for regulating the flow rate flowing in it.

This valve 116 is operated so that only 10% of the flow of the regeneration stream coming from the line 16 is sent countercurrently into the adsorber 11A, the remaining 90% of the nominal flow being conveyed directly to the connecting line 2 via a branch line 117 provided with a regulating valve 118.

During application of the regeneration gas of this step VI, the adsorbent of the adsorber 11A that starts its regeneration is saturated with impurities (water and carbon dioxide) and with carbon monoxide. The first moments of regeneration are accompanied by a strong desorption of the carbon monoxide, the carbon monoxide content of the stream coming from the adsorber 11A possibly reaching more than ten times that of the regeneration stream in line 16. Applied as such to the unit 4, especially if the latter operates by adsorption, this sudden and intense blast of carbon monoxide would result in considerable operating perturbations that would lead to a loss of hydrogen yield and/or to contamination of the production by the unit 4. On the other hand, by mixing the stream coming from the adsorber 11A that has a high carbon monoxide content with the regeneration stream of the branch line 117, in respective proportions of 10 and 90%, the carbon monoxide content of the stream in the connecting line 2 remains at a value compatible with the operating tolerances of the production unit 4.

This step VI continues until the adsorbent of the adsorber 11A is completely discharged of most of the carbon monoxide.

Advantageously, this step may continue so as to damp out the thermal effects of the start of regeneration. This is because, since the stream coming from the adsorber 11A tends to be cooler than the feed standard for the unit 4, mixing it with the hotter stream, for example 20° C., in the branch line 117 makes it possible to smooth out the temperatures of the stream in the connection line 2.

During step VII, from t6 to t7=160 minutes, wherein the total elapsed time from t0 to t7=790 minutes, the elution of the adsorbent of the adsorber 11A continues by means of all of the regeneration stream conveyed by the line 16, the valve 116 being completely open and the valve 118 being closed. Advantageously, the regeneration gas is heated by a heater 119.

During step VIII, from t7 to t8=T=170 minutes, wherein the total elapsed time from t0 to t8=960 minutes, the elution of the adsorbent of the adsorber 11B terminates with all of the unheated regeneration stream, then the valve 116 is closed in order to allow the adsorber to be repressurized. Step VIII is completed when the pressure of the adsorber 11A reaches the value $P_{ads}$.

The process according to the invention thus makes it possible to greatly limit the perturbations in carbon monoxide contents both of the stream of treated gas coming from the treatment unit 11 when an adsorber starts its adsorption phase (steps I and IV), and of the stream of waste gas output by this treatment unit when an adsorber starts its phase of using the regeneration gas (step VI).

This process is easy to implement in a plant according to the prior art, that it is necessary to equip with regulating valves, such as the valves 111, 112, 116 and 118, and with at least one branch line such as the line 117.

Of course, although based on the same idea of diluting the stream coming from the adsorber that has just started its adsorption phase or started to be subjected to the regeneration gas with the stream coming from the adsorber terminating its regeneration phase, or alternatively with the regeneration gas directly, the implementation of steps I and IV and that of step VI are independent, the example of the process according to the invention described above advantageously combining both these.

During steps I or IV, the percentage of the flow of gas mixture to be sent to the adsorber that is starting its adsorption phase is not limited to 5% of the flow of the feed line 12, as in the example developed above. This percentage is generally strictly less than 50% of the flow in the line 12, advantageously less than one third of the flow in the line 12, preferably between 5 and 20% of the flow in the line 12.

Similarly, during step VI, the percentage of the flow of regeneration gas to be sent to the adsorber that is starting to be subjected to the regeneration gas is not limited to 10% of the flow in the discharge line 16, as in the example described above. This percentage is generally strictly less than 50% of the flow in the line 16, advantageously less than one third of the flow in the line 16, preferably between 5 and 20% of the flow in the line 16.

As a variant of the process and independently of the value of the percentage of the abovementioned flows, the duration of step I or of step IV may be predetermined so that it is greater than about 1% of the duration of the adsorption phase of an adsorber (that is to say the period extending from step I to step V in the cycle shown in FIG. 2), advantageously greater than about 5% of the duration of this adsorption phase, preferably between 10 and 20% of the duration of this adsorption phase.

Similarly, the duration of step VI may be predetermined so that it is greater than about 1% of the duration of the regeneration phase of an adsorber (that is to say the duration extending from step VI to VIII), advantageously greater than about 5% of the duration of this regeneration phase, preferably between 10 and 20% of the duration of this regeneration phase.

Moreover, although described above with adsorbers 11A and 11B suitable for retaining, as impurities, water and carbon dioxide, the process according to the invention applies to treatment units with an adsorbent suitable for preferably fixing only water.

In addition, although described with a treatment unit 11 having only two adsorbers, the process according to the invention applies to units comprising a larger number of adsorbers, operating individually or in groups, for example operating in pairs. Thus, the term "adsorber" must be understood as meaning either an adsorber with its own operation, or a group of adsorbers operating in common.

In the case of a treatment unit comprising more than two adsorbers, each respectively operating individually, for example three adsorbers that follow the same cycle with an offset substantially equal to one third of the cycle period, the process according to the invention proves to be particularly advantageous when the adsorption treatment is carried out—for most of the time—by a single adsorber in adsorption phase (as during step III of the cycle shown in FIG. 2). More generally, for a treatment unit comprising N adsorbers, where N is greater than or equal to 2, which follow a cycle of period T, the process according to the invention proves to be advantageous when the duration of the adsorption phase of each adsorber is between T/N inclusive and 2T/N non-inclusive.

Again in the case of a unit comprising more than two adsorbers, and on condition that, over a given time interval of the cycle, at least two adsorbers are in regeneration phase, the stream coming from the adsorber that is starting to be subjected to a portion of the flow of the regeneration gas may be mixed with the rest of this flow, either directly as described above, or after the rest of this flow has been sent to another adsorber that is terminating its regeneration phase. This is because, as described during step VII and at the start of step VIII of the cycle shown in FIG. 2, the stream coming from an adsorber that is in regeneration for a certain time no longer has sufficient perturbations of its contents and of its flow rate. Thus, this steady stream may be used to dilute the stream coming from an adsorber that is starting to be subjected to the regeneration gas.

Figure 5:
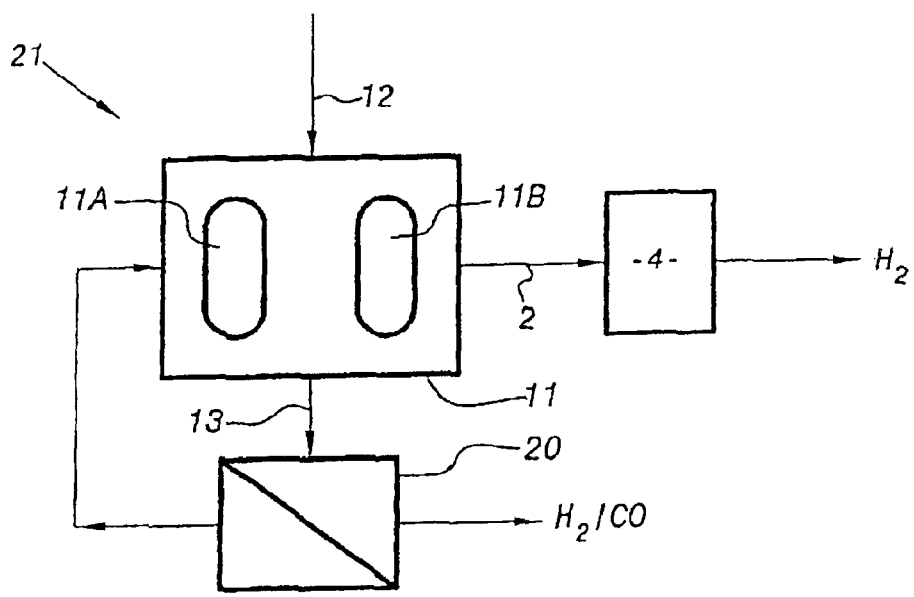
FIG. 5 is a schematic view of a plant for producing a stream with a predetermined hydrogen/carbon monoxide ratio according to the invention, combined with a pure hydrogen production unit.

As shown in FIG. 5, the cryogenic separation unit may, as a variant, be replaced with a permeation unit 20 suitable for producing a permeate with a predetermined hydrogen/carbon monoxide ratio, while forming a non-permeate sent to the treatment unit 11 in the same way as the stream in the line 16 for the plant 1 shown in FIG. 1. The plant 21 thus formed makes it possible to produce a stream with a hydrogen/carbon monoxide ratio that is particularly stable over time, the process according to the invention ensuring that the unit 20 is fed via the line 13 correctly in terms of flow rate stability, hydrogen and carbon monoxide contents and temperature.

As a variant (not shown) of the process according to the invention, the stream coming from the adsorber that has just started its adsorption phase or that has just been subjected to the regeneration gas may be, at least partly, sent to a waste network to be reutilized, for example as combustion gas (fuel gas), especially if a loss of hydrogen and/or carbon monoxide yield by the downstream unit 14 or 20 is acceptable.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An adsorption process for the treatment of a gaseous mixture comprising at least one main constituent to be produced and impurities to be separated from said mixture comprising the steps of:

supplying said gaseous mixture to N adsorbers, wherein said N is at least two;

operating each adsorber in succession through adsorption and regeneration phases in an offset manner of the same cycle of period T;

providing to a first adsorber as it is starting its adsorption phase a portion of said gaseous mixture until said first adsorber is substantially saturated; and providing to at least one other adsorber, as it is terminating its adsorption phase, the remainder of said gaseous mixture.

2. The process according to claim 1, wherein the treated portion from said first adsorber and the treated remainder from said at least one other adsorber are mixed to form the treated gaseous mixture.

3. The process according to claim 2, wherein a part of the treated portion of said gaseous mixture from said first adsorber is directed to a waste network.

4. The process according to claim 1, wherein the duration of the adsorption phase of said first adsorber and said at least one other adsorber is between T/N inclusive and 2T/N noninclusive.

5. The process according to claim 1, wherein the treatment of said gaseous mixture is substantially provided by a single adsorber terminating its adsorption phase.

6. The process according to claim 1, wherein after said first adsorber has been subjected at the start of the adsorption phase to said portion of said gaseous mixture to be treated, further comprises:

a paralleling step, wherein about half of said treated gaseous mixture is obtained from said first adsorber starting its adsorption phase and half of said treated gaseous mixture is obtained from said at least one other adsorber.

7. The process according to claim 1, wherein said portion of gaseous mixture to said first adsorber comprises less than about half of the total gaseous mixture to be treated.

8. The process according to claim 7, wherein said portion comprises less than about one-third.

9. The process according to claim 8, wherein said portion comprises from about 5% to about 20%.

10. The process according to claim 1, wherein the amount of time wherein said portion of said gaseous mixture to said first adsorber comprises an amount of time greater than about 1% of the total adsorption phase period.

11. The process according to claim 10, wherein said amount of time is greater than about 5%.

12. The process according to claim 11, wherein said amount of time is from about 10% to about 20%.

13. The process according to claim 1, wherein said gaseous mixture comprises hydrogen and carbon monoxide as its main constituents.

14. The process according to claim 13, wherein said gaseous mixture further comprises water and carbon dioxide as its impurities.

15. The process according to claim 14, wherein said treated gaseous mixture is cryogenically separated into a substantially pure carbon monoxide stream and a hydrogen-rich stream.

16. The process according to claim 14, wherein said treated gaseous mixture is separated by permeation into a stream with a predetermined ratio of hydrogen to carbon monoxide and into a hydrogen-rich stream.

17. An adsorption process for the treatment of a gaseous mixture consistency comprising at least one main constituent to be produced and impurities to be separated from said mixture comprising the steps of:

supplying said gaseous mixture to N adsorbers, wherein said N is at least two;

operating each adsorber in succession through adsorption and regeneration phases during the regeneration phase, in an offset manner of the same cycle of period T; and providing to a first adsorber as it is starting its regeneration phase, a portion of the regeneration gas until said first adsorber is substantially discharged of said at least one main constituent to be produced.

18. The process according to claim 17, wherein said portion of regeneration gas from said first adsorber and the remaining regeneration gas from the at least one other adsorber are combined to form the discharged gas stream.

19. The process according to claim 18, wherein said portion and said remaining regeneration gas are directly mixed together.

20. The process according to claim 18, wherein said portion from said first adsorber is mixed with another portion of regeneration gas coming from said at least one other adsorber terminating its regeneration phase.

21. The process according to claim 18, wherein a part of the treated portion of said gaseous mixture from said first adsorber is directed to a waste network.

22. The process according to claim 17, wherein said regeneration phase of each adsorber comprises the steps of:

depressurizing said adsorber; and repressurizing said adsorber.

23. The process according to claim 17, wherein said regeneration phase of each adsorber further comprises heating said regeneration gas.

24. The process according to claim 17, wherein said portion of the regeneration gas to said first adsorber comprises less than about half of total regeneration gas flow.

25. The process according to claim 24, wherein said portion comprises less than about one-third.

26. The process according to claim 25, wherein said portion comprises from about 5% to about 20%.

27. The process according to claim 17, wherein the amount of time wherein said portion of regenerating gas to said first adsorber comprises an amount of time greater than about 1% of the regeneration phase period.

28. The process according to claim 27, wherein said amount of time is greater than about 5%.

29. The process according to claim 28, wherein said amount of time is from about 10% to about 20%.

* * * * *